March 19, 1968  J. MISSIOUX ET AL  3,373,868
APPARATUS FOR SELECTING RODLIKE MEMBERS
Filed Nov. 17, 1965
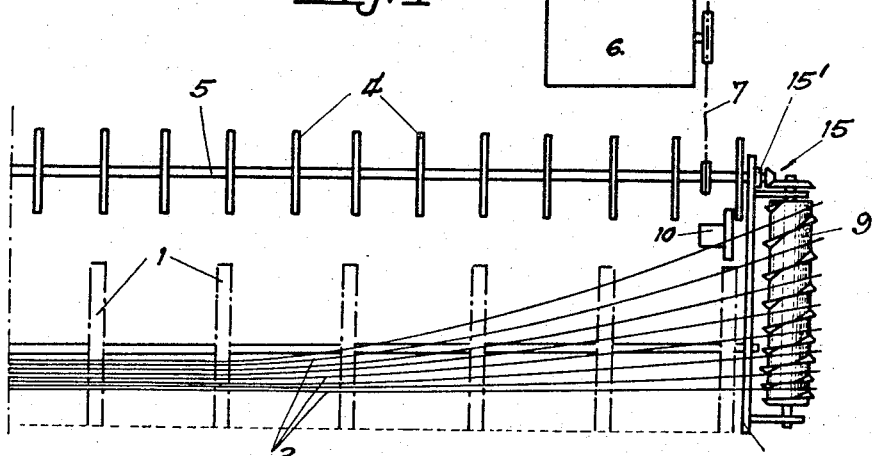
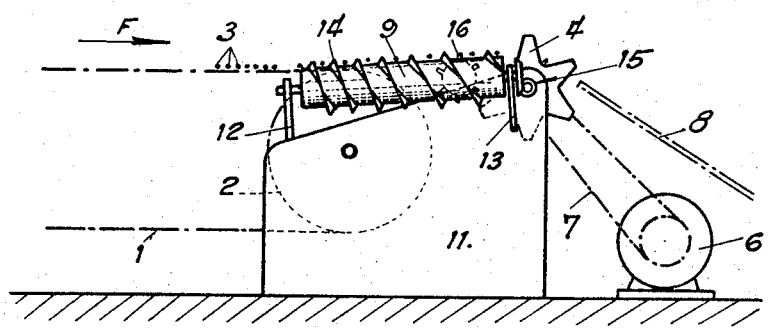
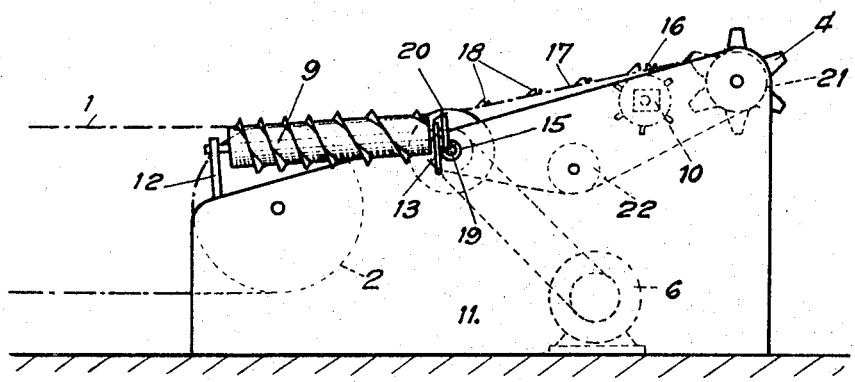
INVENTORS
JEAN MISSIOUX
PIERRE SOUBRIER
JEAN VENNAT
BY
ATTORNEYS

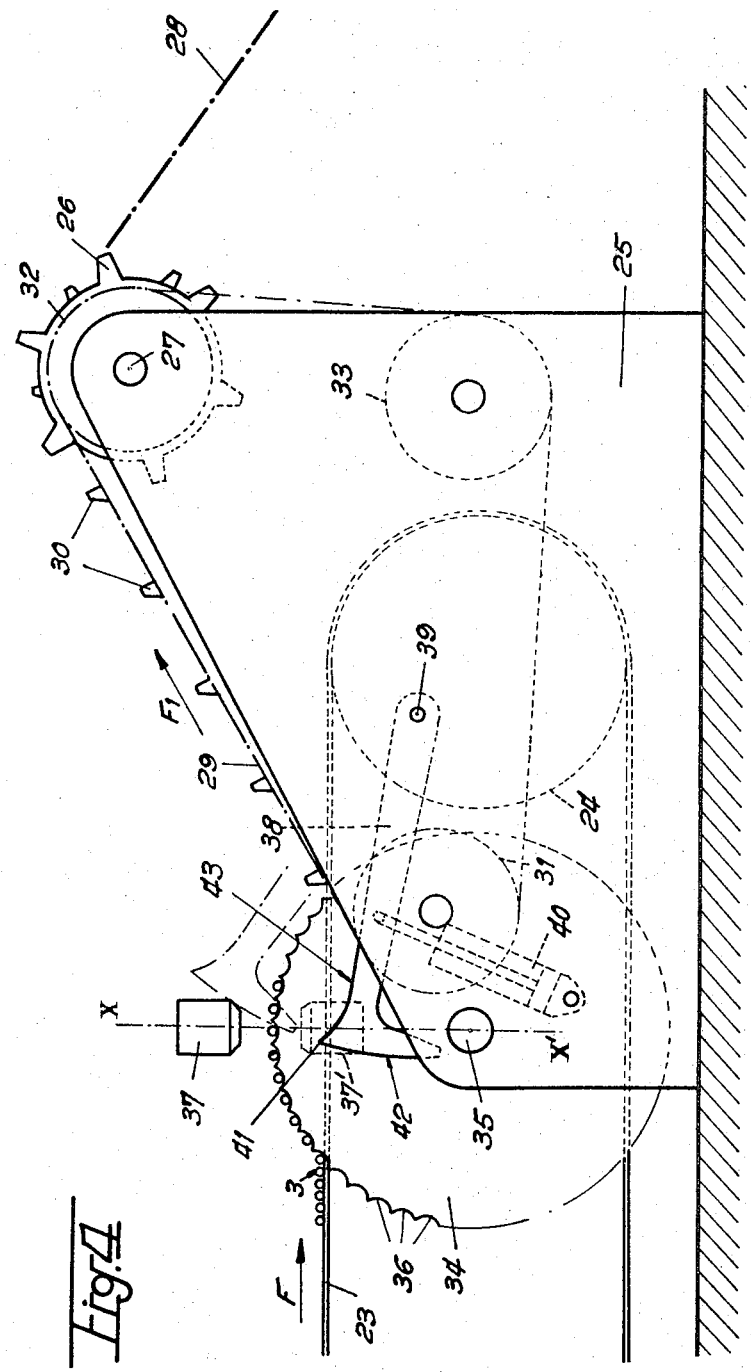

3,373,868
APPARATUS FOR SELECTING RODLIKE MEMBERS

Jean Missioux, Sannois, Pierre Soubrier, Courbevoie, and Jean Vennat, Drancy, France, assignors to Botalam, Paris, France, a corporation of France
Filed Nov. 17, 1965, Ser. No. 508,298
Claims priority, application France, Nov. 19, 1964, 995,469; Mar. 12, 1965, 8,987
9 Claims. (Cl. 209—97)

ABSTRACT OF THE DISCLOSURE

An apparatus having conveyor means for moving, selecting and separating a plurality of rods or the like in a continuous manner comprises an accelerator located along one edge of the conveyor for engaging the rods whereby they may be moved individually through a separator and thereafter grouped and bundled. A selector means, which may be a variable pitch screw, receives the said ends of the rods and moves them from the accelerator to the separator, provided that the rods are of a specified length. The said ends of the rods are moved forwardly at a speed which is greater than the conveyor speed whereby the rods are transferred one at a time by the separator. A rod counting means is positioned in the vicinity of the selector means whereby the engaged ends of the rods can be counted so as to control the number thereof placed in each group during the bundling operation. The short rods are not engaged by the screw member and are subsequently moved along the conveyor into a separate storage zone.

---

This invention relates to a metallurgical installation of the type comprising, among other features, means for conveying rods in a continuous or non-continuous layer and a separator for separating and rocking the rods.

It is known that, in installations of this type, steel rods which are delivered crosswise and in most cases on parallel roller chains have to be transferred to the separator which consists in many cases of a series of rotary star-wheels which are driven in coaxial and synchronous relation.

It is also known that, up to the present time, the rod-transfer operation has been carried out by hand. An operator catches hold of the end of a rod and places this latter in the field of one arm of the first star-wheel, whereupon the rod is caught by the following arm of the star-wheel and so forth in sequence until the rod is finally rocked over the separator. The operator also counts the rods and stops when the quantity required for the purpose of forming a bundle has been separated and rocked.

The object of this invention is to circumvent the disadvantages which arise from the need to employ an operator for the purpose of transferring and counting rods and is accordingly directed to an installation comprising a rod-selector for carrying out rod-transferring and counting operations automatically. The selector unit accordingly comprises an accelerator which is adapted to grip the ends of the rods one by one, then to move said rod-ends forward at a speed which is higher than that of the sheet of rods, then finally to deliver the rods, rod-counting means adapted to stop the transfer operation being disposed in a zone in which the ends of the rods are spaced at a sufficient distance from each other.

In a preferred form of embodiment of the invention, the accelerator consists of an endless screw of increasing pitch which is at least approximately tangent to the sheet of rods, the said endless screw being driven in rotation at a speed such that it carries out one revolution in the time taken by the sheet of rods to move forward over a distance which is approximately equal to the minimum pitch of the screw.

In accordance with another form of embodiment of the invention, the accelerator consists of a notched wheel having a horizontal axis, a top sector of which is placed within the field of the rod-ends of the sheet of rods, the peripheral speed of said wheel being higher than that of the sheet of rods in a ratio which is advantageously of the same order as the ratio of the pitch of the wheel-notches to the mean diameter of the rods to be transferred.

It will be apparent that the accelerator unit can deliver the ends of the rods directly to the first star-wheel if the series of star-wheels is located at a level which is close to that of the sheet of rods.

On the other hand, if the series of star-wheels or equivalent separator is located at a level which is substantially different from that of the sheet of rods, use is made of an intermediate conveyor consisting, for example, of an endless chain with spaced studs or by a vane-wheel of the same type as the star-wheels.

Finally, in addition to the stopping of the rod-transfer operation, the counter is adapted to actuate a lever which is provided with a top separating beak which produces action in the field of the counter, a frontal sector for stopping the upstream rods and a ramp for lifting the counted rods. Said lever thus ensures reliable separation between the counted rods and the rods which still remain upstream.

A clear understanding of the invention will in any case be gained by consideration of the description which follows below, reference being made to the accompanying drawings which show by way of non-limitative example two forms of embodiment of the invention, and in which:

FIG. 1 is a diagrammatic overhead view of an installation provided with a selector in accordance with the invention;

FIG. 2 is a side view of the same installation;

FIG. 3 is a similar view of another installation; and

FIG. 4 is a side view of yet another installation.

There are shown in FIGS. 1 and 2 a series 1 of endless chains which pass over guide sprockets 2 and thus form a continuous constant-speed track for rods 3 which are fed crosswise in the direction of the arrow F.

It is also known that said rods must be transferred one by one to a separator, the first element of which is in this case constituted by a series of rotary star-wheels 4 with spaced arms or branches which are all driven on a common axis 5 by means, for example, of a motor 6 and a driving-belt 7.

The separator also comprises a sloping ramp 8 which is shown in chain-dotted lines in FIG. 2. It need merely be recalled that the ends of the rods 3 must be brought opposite an arm of the first star-wheel which draws them in its movement so as to permit of their engagement with the following arm of the following star-wheel and so forth in sequence. Thus, the rods are rocked over the star-wheel line and then reach, for example, a receiving cradle which is placed at the bottom of the sloping ramp 8.

This process of transfer of the rod-ends, which is accompanied by a counting operation so as to make it possible to form bundles consisting of a predetermined number of rods, is carried into pactical effect by virtue of the selector in accordance with the invention, as essentially constituted by the endless screw 9 and the counter 10.

The end-plate 11 which carries the shafts of the sprockets 2 and the shaft 5 of the star-wheels 4 is fitted with two journal-bearings 12 and 13 for the endless screw 9, the spiral 14 of which is of increasing pitch, and which is driven in synchronism with the star-wheels by means of two bevel-pinions 15 and with interposition of a clutch unit 15'.

The speed of rotation of the screw 9 is chosen so that the rod-ends move at a speed which is close to that of the conveyor-chains 1 in the engagement zone, that is to say in the minimum-pitch zone of the screw which is located near and approximately tangent to the surface which is formed by the conveyor-chains 1.

The increasing pitch of the screw 9 results in the fact that the ends of the rods are accordingly accelerated and therefore widely spaced, thus permitting the arms of the first star-wheel to engage with said rod-ends one by one so as to initiate the separating process explained above. Moreover, this spacing of the rod-ends makes it possible to count the rods by means of the counter 10 which is disposed close to the downstream end of the selector.

Said counter can be designed, for example, in the form of a toothed wheel 16 which is actuated tooth by tooth by the rods in synchronism with a similar wheel placed inside the housing 10 which interrupts the light beam of a counting photoelectric cell as each rod passes. When a predetermined number of rods has passed in front of the counter, said photoelectric cell can disengage the clutch unit 15' and if necessary also stop the motor which drives the conveyor-chains 1.

Finally, the selector as herein described makes it possible to transfer to the separator including the star-wheels a number of rods which is always constant even if the conveyor-chains 1 do not feed the rods in a continuous manner, and even if the rods are in more or less disordered array on the chains 1.

The representation of FIG. 1 is in fact theoretical since, in actual fact, the rods and especially rods of small diameter are far from being in exactly parallel and uniform alignment; on the contrary, they are frequently tangled and straddle each other.

Furthermore, it will have been noted that the device herein described eliminates short rods since the ends of these latter do not engage with the screw, with the result that such short rods fall between the conveyor-chains 1 and the star-wheels 4.

It will also have been noted that, in the installation according to FIGS. 1 and 2, the conveyor-chains 1 and the star-wheels 4 are located substantially at the same level, with the result that the screw 9 can be set at an angle so as to slope upwards to a slight extent, thus dispensing with the need of any additional conveyor system.

On the contrary, the installation according to FIG. 3 is provided with star-wheels 4 which are set at a distinctly higher level than the conveyor-chains 1.

In addition to the units which have been described above and which are identical in FIG. 3, the end-plate 11 is therefore provided with an additional conveyor-chain 17 with spaced teeth 18. This chain is driven directly by the motor 6 and chain 7 which drives the shaft 19 of its upstream sprocket 20. Said shaft 19 accordingly carries the bevel-pinion 15 which actuates the screw 9.

The drive to the star-wheels is effected by means of the downstream sprocket 21 of the chain 17 which is additionally provided with a tension-sprocket 22.

Finally, the counter 10–16 is placed in the vicinity of the downstream end of the conveyor-chain 17 so that the counting operation is carried out as near as possible to those units which are designed to receive the rods in constant number.

This installation obviously operates in the same manner as in the previous form of embodiment since the rod-ends which are caught up by the screw 9 are accelerated and separated by said screw, then delivered to the chain 17 which conveys them to the first star-wheel.

Reference will now be made to FIG. 4 which shows an installation of the same type with its series of conveyor-chains 23, guide sprockets 24, end-plate 25, star-wheels 26 which are rotatably mounted at 27 and its sloping ramp 28.

In order to effect the transfer of the ends of the rods 3 which are fed in the direction of the arrow F, there is employed as in the previous example a conveyor-chain 29 with spaced teeth 30, said conveyor-chain being mounted on an upstream sprocket 31, a downstream sprocket 32 and a tension-sprocket 33. The chain 29 and star-wheels 26 are driven from a motor which has not been shown in the drawings by the shaft 27 on which the star-wheels and downstream sprocket 32 are mounted. The device is completed by an accelerator which is designed in this example in the form of a wheel 34 which has a horizontal shaft 35. A circular sector of said wheel which has an angle at the center of 90° is placed within the field of the ends of the rods 3. The wheel 34 is also provided with notches 36 which, in the particular example which is illustrated, each have a width approximately three times the diameter of the rods.

The shaft 35 is therefore driven in rotation from a motor or belt-drive system which has not been shown in the drawings in such a manner that the peripheral speed of the wheel 34 is approximately three times the speed of the conveyor-chains 23.

It follows from the foregoing that a notch 36 can only engage one end of a rod 3, it being understood that, if any one notch should remain unoccupied, the operation of the device is not affected.

The rods as thus accelerated and spaced will be released by the notches 36 so as to be taken by the teeth 30 and transferred to the star-wheels.

In this example, the counter is placed along the axis X–X'. Said counter can be of the type shown in FIGS. 1, 2 and 3 or of the photoelectric cell type as shown at 37 and 37'. The function of said counter is to count the ends of the rods which move past within the notches 36 and to stop the wheel 34 when a predetermined number of rods has moved past.

However, it may happen that, as a result of inertia, the wheel is not immediately brought to a standstill. It is in order to avoid any erroneous counts resulting from overshoot that provision has been made for a lever 38 which is pivotally mounted at 39 and which is caused by the counter to swing over from the position shown in full lines to the position shown in broken lines, for example by means of a jack 40, while at the same time stopping the wheel 34. The lever 38 is provided with a beak 41 which immediately separates the rods which have already been counted (downstream of the axis X–X') from the rods which follow (upstream of the axis X–X'). The said lever is also provided with a frontal sector 42 which stops the upstream rods which have not been counted and a ramp 43 which lifts the rods which have already been counted and thus guides said rods onto the chain 29 for subsequent transfer.

As will in any case be understood, the forms of embodiment of the invention which have just been described have only been given by way of non-limitative example and a large number of modifications can be made therein without consequently departing from the scope or the spirit of the invention.

What we claim is:

1. An apparatus for selecting elongated rod-like members, comprising:
   conveyor means defining a relatively wide path along which said members are moved in a direction transverse of said members;
   screw means near one edge, only, of said path and adapted to engage certain of said members one by one near one end of each and to move said engaged ends in said direction along said path at a speed which is greater than the speed at which said conveyor means moves said members in said direction, whereby adjacent ones of said certain members are moved into nonparallel positions; and separator means arranged to receive said ends of said certain members from said screw means while the other ends thereof are still on said conveyor means and advance said certain members, only, along said path.

2. The apparatus as defined in claim 1, including counting means arranged for engagement by said ends of said members, said counting means being adapted to stop the movement of said members along said path after a predetermined count.

3. The apparatus of claim 1, wherein said screw means has an increasing pitch in said direction for accelerating the movement of the engaged ends of said members; and means rotating said screw means approximately once as said members move in said direction a distance approximately equal to the minimum pitch of the screw.

4. The apparatus as defined in claim 1, including an intermediate conveyor which receives said members from said screw means and delivers them to the separator means.

5. An apparatus for segregating elongated rod-like members of differing lengths, comprising:

conveyor means defining a relatively wide path along which said members are moved in one direction transverse of said members;

screw means near one edge, only, of said path and adapted to engage one end of each member of a predetermined length, one at a time, and move said engaged ends in said direction along said path at a speed greater than the speed at which said conveyor means moves said members in said direction;

means causing members shorter than said predetermined length to move away from said path in another direction;

separator means arranged to receive said ends of said members of predetermined length from said screw means and to advance said predetermined members, only, along said path.

6. The apparatus as defined in claim 5, including rod counting means arranged for actuation by said ends of said rods, said counting means being adapted to stop the movement of said members in said one direction after a preselected count.

7. The apparatus as defined in claim 5, wherein said screw means has an increasing pitch in said one direction accelerating the movement of said ends, said screw means being rotated once each time said members are moved along said path in said direction a distance approximately equal to the minimum pitch of the screw.

8. The apparatus as defined in claim 5, including an intermediate conveyor for receiving said members from said screw means and delivering them to the separator means.

9. An apparatus as defined in claim 7, wherein said separator means comprises a plurality of spaced star wheels rotating on a common axis, said predetermined members being transverse of said axis as they are engaged by said star wheels.

References Cited

UNITED STATES PATENTS

| 1,935,087 | 11/1933 | Free | 198—213 X |
| 2,284,286 | 5/1942 | Krueger | 198—34 X |
| 3,127,829 | 4/1964 | Rossi | 198—104 X |
| 3,136,404 | 6/1964 | Hebard et al. | 198—34 |

FOREIGN PATENTS

| 828,002 | 2/1960 | Great Britain. |

GERALD M. FORLENZA, *Primary Examiner.*

EVON C. BLUNK, *Examiner.*

R. J. HICKEY, *Assistant Examiner.*